United States Patent
Huang (10) Patent No.: US 10,733,715 B2
(45) Date of Patent: Aug. 4, 2020

(54) IMAGE PROCESSING METHOD AND APPARATUS, ELECTRONIC DEVICE AND STORAGE MEDIUM

(71) Applicant: BEIJING KINGSOFT INTERNET SECURITY SOFTWARE CO., LTD., Beijing (CN)

(72) Inventor: Chunjen Huang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 161 days.

(21) Appl. No.: 15/974,041

(22) Filed: May 8, 2018

(65) Prior Publication Data
US 2019/0005632 A1  Jan. 3, 2019

(30) Foreign Application Priority Data

Jun. 30, 2017 (CN) .......................... 2017 1 0531744

(51) Int. Cl.
*G06T 5/50* (2006.01)
*G06K 9/00* (2006.01)
(Continued)

(52) U.S. Cl.
CPC ............ *G06T 5/50* (2013.01); *G06K 9/00281* (2013.01); *G06T 5/005* (2013.01); *G06T 11/00* (2013.01); *G06T 11/60* (2013.01); *G06K 9/00228* (2013.01); *G06K 9/00308* (2013.01); *G06T 2207/20221* (2013.01)

(58) Field of Classification Search
CPC ............. G06K 9/00268; G06K 9/621; G06K 9/00248; G06K 9/00221; G06K 9/00275; H04N 5/23219; G06T 11/60; G06T 2207/30201; G06T 2207/20221
See application file for complete search history.

(56) References Cited

U.S. PATENT DOCUMENTS

2009/0196464 A1\* 8/2009 Dimitrova .......... G06K 9/00295
  382/118
2009/0262987 A1\* 10/2009 Ioffe ................... G06K 9/00281
  382/118
(Continued)

OTHER PUBLICATIONS

Bitouk ("Face Swapping: Automatically Replacing Faces in Photographs", Aug. 2008) (Year: 2008).\*
(Continued)

*Primary Examiner* — Dung Hong
(74) *Attorney, Agent, or Firm* — Osha Liang LLP (57) ABSTRACT

Embodiments of the present disclosure provide an image processing method, an image processing apparatus, an electronic device and a storage medium, in order to improve a poor image effect when an image processing is performed for exchanging faces. The image processing method comprises: acquiring a first face image in an input image; extracting facial features of the first face image; determining a representation vector of the first face image according to the facial features; determining a target face image in a preset face image library according to the representation vector; and performing a face-exchange processing on the first face image according to the target face image, so as to obtain an output image.

18 Claims, 5 Drawing Sheets

(51) Int. Cl.
*G06T 11/60* (2006.01)
*G06T 11/00* (2006.01)
*G06T 5/00* (2006.01)

(56) References Cited

U.S. PATENT DOCUMENTS

| 2011/0078097 | A1* | 3/2011 | Thornton | G06F 21/6245 |
| | | | | 706/12 |
| 2013/0108123 | A1* | 5/2013 | Hwang | G06K 9/00268 |
| | | | | 382/118 |
| 2013/0121584 | A1* | 5/2013 | Bourdev | G06K 9/00281 |
| | | | | 382/190 |
| 2015/0170000 | A1* | 6/2015 | Yang | G06K 9/6267 |
| | | | | 382/224 |
| 2016/0335774 | A1* | 11/2016 | Hsieh | G06K 9/00281 |

OTHER PUBLICATIONS

Haowei Liu ("Face Detection and Recognition on Mobile Devices", ISBN 978-0-12-417045-2, published 2015, p. 11-38). (Year: 2015).*
Office Action issued in corresponding CN Application No. 201710531744.X with English translation dated Mar. 2, 2020 (15 pages).
Zhong, Qianli "Automatic Face Replacement in Images" University of Electronic Science and Technology of China, Jun. 2016 (6 pages).
Yushi, Zhang, Convolution "face change" Apr. 4, 2017 20:37:11 15284 Collection 8 (5 pages).

* cited by examiner

IMAGE PROCESSING METHOD AND APPARATUS, ELECTRONIC DEVICE AND STORAGE MEDIUM

CROSS-REFERENCE TO RELATED APPLICATIONS

This application is based on and claims a priority to Chinese Patent Application No. 201710531744.X, filed on Jun. 30, 2017, the entire contents of which are incorporated herein by reference.

FIELD

The present disclosure relates to the imaging processing technology field, and more particularly to an image processing method, an image processing apparatus, an electronic device and a storage medium.

BACKGROUND

With the development of internet and computer technology, face exchange has become a new hot topic among public. Multiple application with face exchange function are developed, which provide people with a source of enjoyment.

In the prior art, typically, a face recognition is performed on a face region in a static image, and then the face region in an original image may be extracted and placed in a target image. After that, a face fusion or a naturalization processing and the like may be performed to obtain a natural image, such that a face exchange may be finished. However, since there is a certain difference between a facial feature of the exchanged image and that of the original image, the image effect is dissatisfied.

DISCLOSURE

The present disclosure provides an image processing method, an image processing apparatus, an electronic device and a storage medium.

A first aspect of embodiments of the present disclosure provides an image processing method, including: acquiring a first face image in an input image; extracting facial features of the first face image; determining a representation vector of the first face image according to the facial features; determining a target face image in a preset face image library according to the representation vector; and performing a face-exchange processing on the first face image according to the target face image, so as to obtain an output image.

A second aspect of embodiments of the present disclosure provides an image processing apparatus, including: an acquiring unit, configured to acquire a first face image in an input image; an extracting unit, configured to extract facial features of the first face image; a first determining unit, configured to determine a representation vector of the first face image according to the facial features; a second determining unit, configured to determine a target face image in a preset face image library according to the representation vector; and a face-exchanging unit, configured to perform a face-exchange processing on the first face image according to the target face image, so as to obtain an output image.

A third aspect of embodiments of the present disclosure provides an electronic device. The electronic device includes a housing, a processor, a memory, a circuit board, a power supply circuit. The circuit board is located in a space enclosed by the housing. The processor and the memory are positioned on the circuit board. The power supply circuit is configured to provide power for respective circuits or components of the electronic device. The memory is configured to store executable program codes. The processor is configured to run a program corresponding to the executable program codes by reading the executable program codes stored in the memory, to perform the image processing method according to the first aspect of embodiments of the present disclosure.

A fourth aspect of embodiments of the present disclosure provides a non-transitory computer-readable storage medium having stored therein a computer program that, when executed by a processor of a device, causes the processor to perform the image processing method according to perform the image processing method according to the first aspect of embodiments of the present disclosure.

A fifth aspect of embodiments of the present disclosure provides an application program executable for the image processing method according to the first aspect of embodiments of the present disclosure.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

EMBODIMENTS OF THE PRESENT DISCLOSURE

Clear and complete descriptions will be made to technical solutions of embodiments of the present disclosure with reference to drawings of embodiments of the present disclosure. Obviously, the described embodiments are merely parts of embodiments instead of all embodiments of the present disclosure. Based on the embodiments illustrated in the present disclosure, other embodiments obtained by those skilled in the art without any inventive labor are all covered by the scope of the present disclosure.

Terms such as "first", "second" and "third" used in the specification, in claims and in drawings are configured herein for distinguishing different subjects, but not for showing a particular sequence. Furthermore, the terms such as "include", "comprise" and any other variations thereof are intended to be non-exclusive. For example, a process, a method, a system, a product or a device including or comprising a sequence of blocks or units is not limited to include or comprise the listed blocks or unit, instead, they alternatively further include or comprise other blocks and units that are not listed or alternatively further include inherent blocks or units of the process, the method, the system, the product or the device.

Term such as "embodiments" referred in the present disclosure means that, particular features, structures and characteristics described in combination with embodiments may be covered in at least one embodiment of the present disclosure. Usages of the term for many times in the specification are not necessary to refer to a same embodiment or same embodiments, and they are not independent embodiments mutually exclusive with other embodiments or unimportant embodiments. It may be explicitly or implicitly understood by those skilled in the art that, embodiments described herein can be combined with other embodiments.

The electronic device described in embodiments of the present disclosure may include a smart phone (such as an Android phone), a tablet computer, a palmtop computer, a laptop, a mobile internet device (MID), a wearable device or other electronic device. The above examples are exemplary but not exhaustive. The electronic device described in embodiments includes but is not limited to the above.

Embodiments of the present disclosure provide an image processing method, an image processing apparatus, an electronic device and a storage medium, for solving a problem of a poor image effect when an image processing is performed for exchanging faces. The image processing method, the image processing apparatus, the electronic device and the storage medium will be described in detail as follows.

Figure 1:
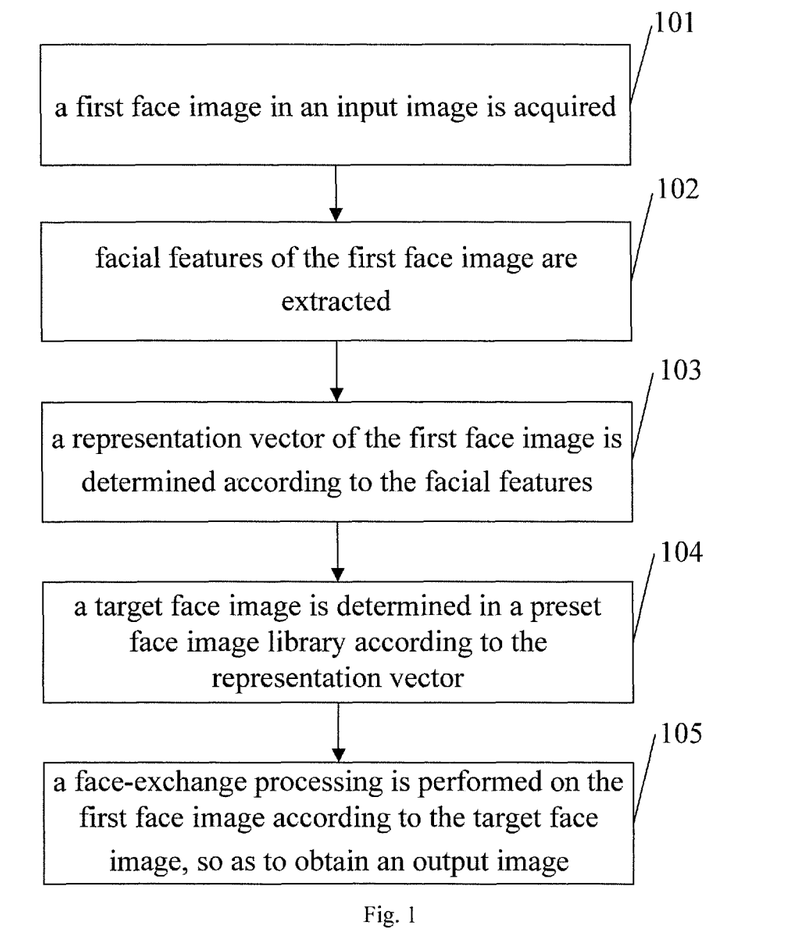
FIG. 1 is a flow chart of an image processing method according to an embodiment of the present disclosure.

Referring to FIG. 1, FIG. 1 is a flow chart of an image processing method according to an embodiment of the present disclosure. The image processing method may include followings.

At block 101, a first face image in an input image is acquired.

Embodiments of the present disclosure are based on a scene of face exchanging, when an input image includes a first face image, an act at block 102 is performed, otherwise, the process ends or an instruction for uploading the input image again is sent to the user.

In embodiments of the present disclosure, feature extraction algorithms such as Histogram of Orientated Gradient (HOG), Local Binary Pattern (LBP), Gabor wavelet transform, Haar-like may be used to perform a face recognition, which are not limited herein.

Alternatively, a feature value of the input image may be extracted, and an integration processing may be performed on the input image according to the feature value, so as to obtain an integral image. An adaptive enhancement algorithm may be adopted for distinguishing enhanced classifiers for faces and enhanced classifiers for non-faces in the integral image. The enhanced classifiers for faces are connected in series through a waterfall typed cascading classifier, so as to obtain a face image. It is determined whether the face image is the first face image. If the face image is the first face image, it is determined to acquire the first face image in the input image and to perform the act at block 102. With the method, different features are calculated with same calculation time in various scales, such that a large amount of regions to be detected are disqualified rapidly, an average detecting overhead is reduced, thereby improving face recognizing efficiency.

It is to be noted that, the input image may be uploaded to a server end or imported into a local end. When the input image is uploaded to the server end, a limitation of local image library may be broke, the number of the faces in the preset face image library may be enlarged, which is useful for improving an accuracy of a face-exchanged image.

In this embodiment, taking the first face image as an example, if the input image includes several face images such as a second face image and a third face image and the like, the several face images can be processed sequentially according to the image processing method according to embodiments of the present disclosure.

At block 102, facial features of the first face image are extracted.

In embodiments of the present disclosure, extraction of the facial features from the first face image can be implemented by a deep learning based algorithm. For different parts of the face, different scaled features are extracted and then are classified by neural-like network classifiers. Finally, various facial features are obtained. The various facial features include gender, expression, facial organ state, similarity with faces in other face images and the like.

At block 103, a representation vector of the first face image is determined according to the facial features.

In embodiments of the present disclosure, the representation vector may include: a plurality of dimensions including expression feature, gender feature, facial organ feature and the like. Take a target dimension of the representation vector as an example, in which the target dimension is one dimension of the representation vector. Alternatively, the facial features are matched to a feature parameter of the target dimension, so as to obtain a plurality of matching values, and a matching value greater than or equal to a preset threshold in the plurality of matching values is determined as a representation probability value corresponding to the target dimension.

Specific formats of the representation probability values are not limited in embodiments, which may be in a percent format or in a decimal format. That is to say, the facial features of the first face image are matched with the feature parameter of each dimension respectively, so as to obtain a plurality of matching values. For each dimension, a matching value greater than or equal to the preset threshold is selected determined as the representation probability value corresponding to the dimension. Furthermore, the facial features are represented through the probability, thereby improving an accuracy of representing the facial features.

For example, it is assumed that the preset threshold is 10%, and the representation vector includes the expression feature, the gender feature and the facial organ feature. In an image of Incredible Hulk illustrated in FIG. 2, the facial features of Hulk are obtained, and the facial features are matched with feature parameters of the expression feature, the gender feature and the facial organ feature respectively. The feature parameters for example include "anger", "happiness", "sadness", "male", "female", "double-fold eyelids", "high-bridged nose", "no glasses", "square face" and the like. The obtained matching values may be as follows: 80% for "anger" of the expression feature, 5% for "sadness" of the expression feature, 98% for "male" of the gander feature, 2% for "female" of the gender feature, 70% for "square face" of the facial organ feature, 100% for "no glasses". As the preset threshold is set to be 10%, the first representation information of Hulk is {"anger" 80%, "male" 98%, "square face" 70%, "no glasses" 100%}.

For another example, an image including a sad face may be recognized from the input image, two expression features including "sadness" and "confused" may be obtained, and the representation probability value of "sadness" is 80% and that of "confused" is 20%. By describing the facial features with the representation probability values, all possible facial information may be included, thereby improving accuracy of describing the facial features.

Alternatively, at least one representation probability value corresponding to each of the N dimensions is obtained by estimating the facial features, so as to obtain M representation probability values. A weighting processing is performed on the M representation probability values, so as to obtain the representation vector. M is greater than or equal to N. That is to say, various facial features are taken into consideration fully and comprehensively, to make an optimal strategy, and thus to improve an accuracy of judging the facial expression.

For example, when the probability that the expression feature is "happiness" is 60%, and the probability that the action feature is "smile" is 80%, the weight of the probability for "happiness" of the expression feature may be increased and a weighted representation probability for "happiness" of the express features may be set as 80%. Alternatively, when the probability that the expression feature is "grimness" is 60%, the probability for "wearing sunglasses" is 75%, and the probability for "having moustache" is 80%, the weight of the probability for "grimness" of the expression feature may be increased and a weighted representation probability for "grimness" of the expression feature may be set to be 80%.

At block 104, a target face image is determined in a preset face image library according to the representation vector.

In embodiments of the present disclosure, various face images are included in the preset face image library, at least one target face image may be selected from the preset face image library according to the representation vector. When more than one target face images are determined, an instruction for specifying face image sent by the user may be received, such that the target face image to be exchanged is determined. Alternatively, all target face images may be used for exchanging to obtain a plurality images for user's selection.

Alternatively, the input image may be input into an image generating network trained under a neural-like network, and the target face image may be output by the image generating network according to the representation vector of the input image and the preset face image library.

At block 105, a face-exchange processing is performed on the first face image according to the target face image, so as to obtain an output image.

In embodiments, the facial features of the first face image in the input image are used to replace those of the second face image in the target face image. In other words, the difference between the output image and the target face image is the face image.

Figure 2:
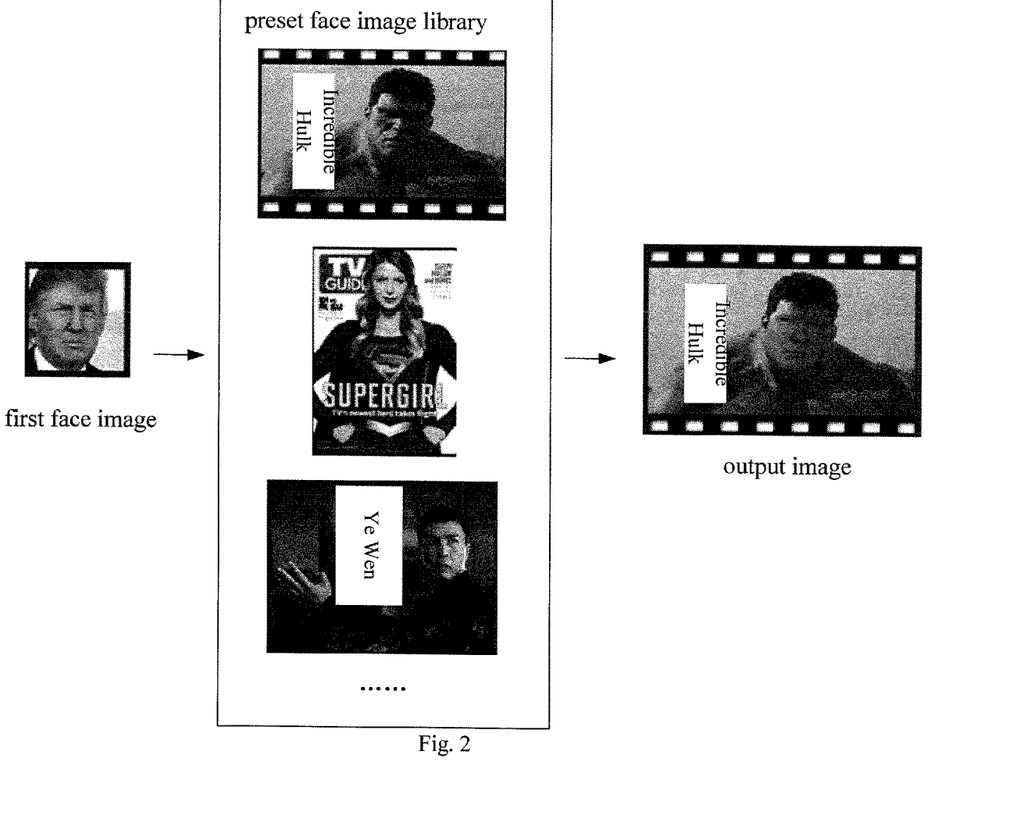
FIG. 2 is a schematic diagram illustrating a scene of the image processing method according to an embodiment of the present disclosure.

For example, a schematic diagram illustrating a scene of the image processing method is shown in FIG. 2. The first face image of the input image is an image of Trump. Facial features of the image of Trump are acquired to determine the representation vector of the facial features as {"anger" 80%, "male" 98%, "square face" 70%, "no glasses" 100%}. It is assumed that face images of the Incredible Hulk, Superwoman and Ye Wen are included in the preset face image library, the target face image is determined as Hulk according to the representation vector and representation vectors of the face images included in the preset face image library. The face exchange may be performed between the image of Trump and an image of Hulk. As can be seen from FIG. 2, the face image of Hulk is replaced with the face image of Trump in the output image.

Alternatively, the second face image in the target face image is preprocessed, so as to obtain a third face image. The facial features of the third face image are replaced with those of the first image face, so as to obtain a fourth face image. The fourth face image is rectified with a loss function to obtain a fifth face image. The fifth face image is merged with an image other than the second face image in the target face image, to obtain an output image.

The preprocessing may include performing a face alignment, an image enhancement, a normalization and the like. By performing the face alignment on the second face image, a face image with proper facial organ positions may be obtained. The converted second face image is processed with a reverse face-alignment, a face image with same facial organ positions as those of the second face image in an image corresponding to the target face image is obtained, thereby enhancing an image effect. The image enhancement is to improve quality of the face image, so as to not only make the image clearer visually, but also facilitate processing and recognition of the image through a computer. The normalization is to acquire a standard face image having dimensional homogeneity and consistent gray value range, so as to further improve the image effect.

When the preprocessing is the face alignment, in order to ensure that an orientation of a face in the output image is same with that in the target face image, it is required to perform a reverse face-alignment on the fourth face image. Alternatively, the reverse face-alignment is performed on the fourth face image to obtain a sixth face image. The loss function is used to rectify the sixth face image to obtain the fifth face image, thereby improving the image effect.

The loss function is a network image trained under a neural-like network, for rectifying image loss after the face exchange, thereby improving the image effect.

It is to be illustrated that, the facial features of the second face image are not cleared from the converted second face image. That is to say, after the face exchange, the converted second face image contains the facial features of the first face image and the facial features of the original second face image.

Figure 3:
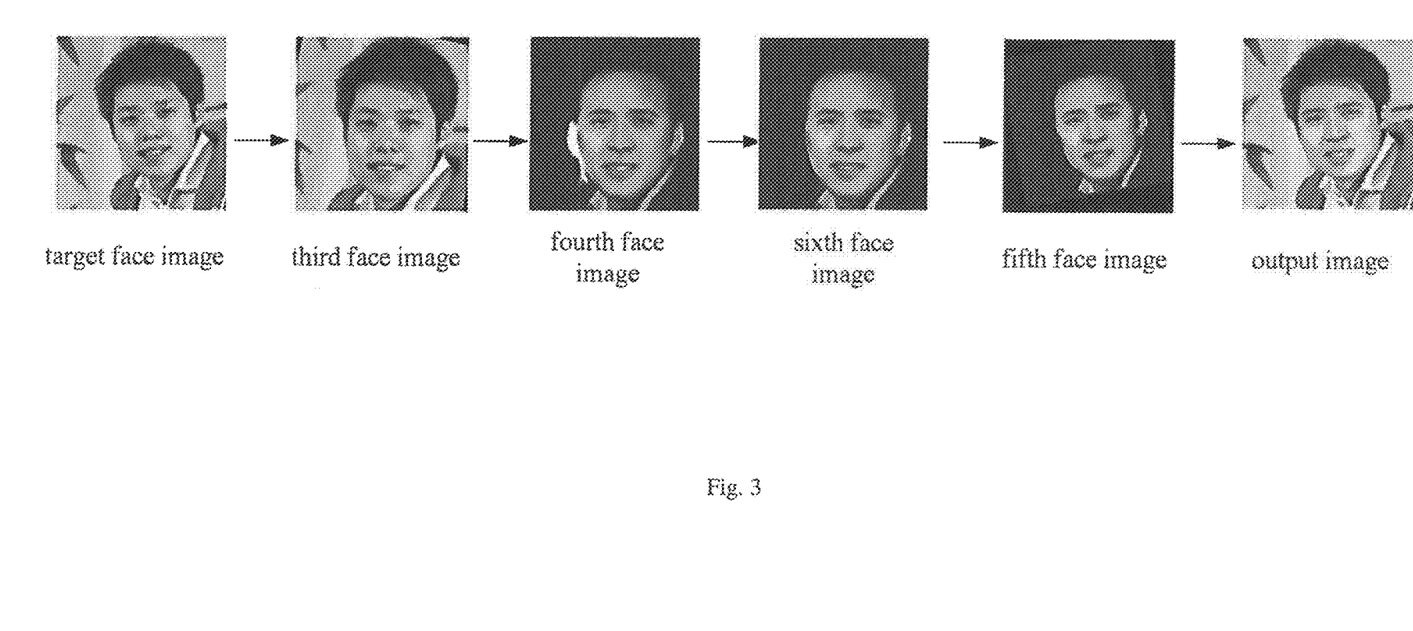
FIG. 3 is a schematic diagram of a process of face exchanging according to an embodiment of the present disclosure.

For example, taking a scene of exchanging face illustrated in FIG. 3 as an example, the third face image is obtained by perforating the face alignment to the second face image of the target face image. The fourth face image is obtained by replacing the facial features of the third face image with the facial features of the first face image. The sixth face image is obtained by perforating the reverse face-alignment to the fourth face image. The fifth face image is obtained by rectifying the sixth face image with the loss function. With the above processes, the image effect may be improved. The fifth face image is combined with rest of the target face image other than the second face image to obtain the output image. Therefore, the image effect may be improved after the face exchange, and enjoyment is improved.

With the image processing method described in FIG. 1, since the target face image is determined according to the representation vector acquired according to the facial features, the target face image may be the most matched face image with the first face image in the preset face image library, such that the image effect after the face exchange may be improved, the enjoyment may be increased, and it is unnecessary for the user to select a target face image manually, thus improving the operational convenience.

Figure 4:
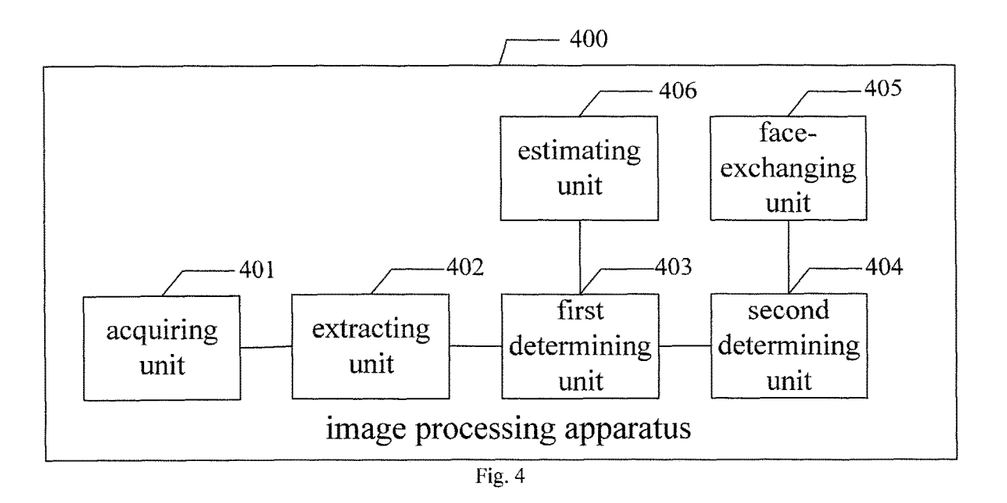
FIG. 4 is a block diagram of an image processing apparatus according to an embodiment of the present disclosure.

Referring to FIG. 4, FIG. 4 is a block diagram of an image processing apparatus according to an embodiment of the present disclosure. The image processing apparatus 400 may include: an acquiring unit 401, an extracting unit 402, a first determining unit 403, a second determining unit 404 and a face-exchanging unit 405. The acquiring unit 401 is configured to acquire a first face image in an input image. The extracting unit 402 is configured to extract facial features of the first face image. The first determining unit 403 is configured to determine a representation vector of the first face image according to the facial features. The second determining unit 404 is configured to determine a target face image in a preset face image library according to the representation vector. The face-exchanging unit 405 is configured to perform a face-exchange processing on the first face image according to the target face image, so as to obtain an output image.

With the image processing apparatus described in FIG. 4, since the target face image is determined according to the representation vector acquired according to the facial features, the target face image may be the most matched face image with the first face image in the preset face image library, such that the image effect after the face exchange may be improved, the enjoyment may be increased, and it is unnecessary for the user to select a target face image manually, thus improving the operational convenience.

Alternatively, the representation vector may include N dimensions, in which N is an integer greater than 1. The image processing apparatus 400 also includes an estimating unit 406. The estimating unit 406 is configured to estimate the facial features to obtain at least one representation probability value corresponding to each of the N dimensions, so as to obtain M representation probability values. The first determining unit 403 is further configured to perform a weighting processing on the M representation probability values, so as to obtain the representation vector.

M is greater than or equal to N. That is to say, various facial features are taken into consideration fully and comprehensively, to make an optimal strategy, and thus to improve an accuracy of judging the facial expression.

Alternatively, the estimating unit 406 is further configured to match the facial features to a feature parameter of a target dimension, so as to obtain a plurality of matching values, in which the target dimension is one of the N dimensions of the representation vector; and to determine a matching value greater than or equal to a preset threshold in the plurality of matching values as a representation probability value corresponding to the target dimension.

Specific formats of the representation probability values are not limited in embodiments, which may be in a percent format or in a decimal format. That is to say, the facial features of the first face image are matched with the feature parameter of each dimension respectively, so as to obtain a plurality of matching values. For each dimension, a matching value greater than or equal to the preset threshold is selected as the representation probability value corresponding to the dimension. Furthermore, the facial features are represented through the probability, thereby improving an accuracy of representing the facial features.

Figure 5:
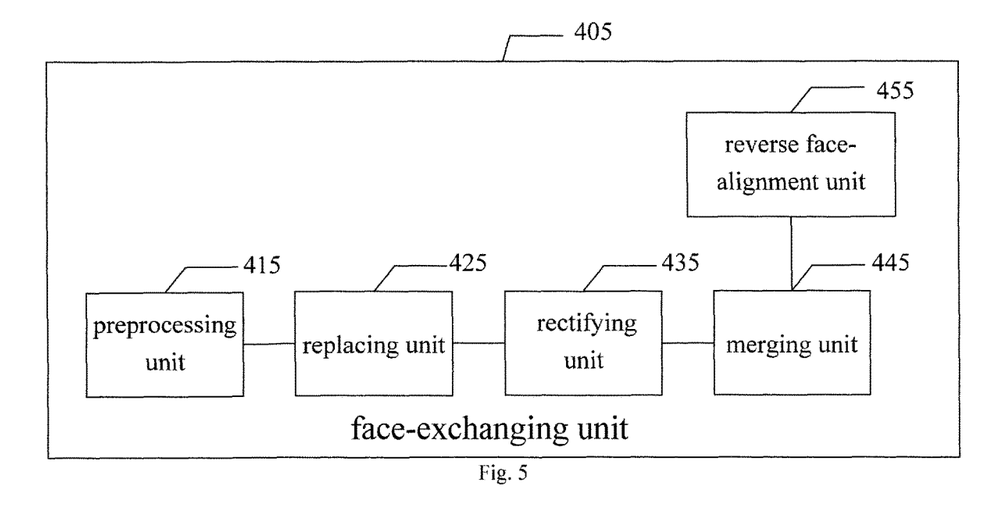
FIG. 5 is a structure diagram of a face-exchanging unit according to an embodiment of the present disclosure.

Alternatively, as shown in FIG. 5, the face-exchanging unit 405 may include: a preprocessing unit 415, a replacing unit 425, a rectifying unit 435 and a merging unit 445. The preprocessing unit 415 is configured to perform a preprocessing on a second face image in the target face image, so as to obtain a third face image. The replacing unit 425 is configured to replace facial features of the third face image with the facial features of the first face image, so as to obtain a fourth face image. The rectifying unit 435 is configured to rectify the fourth face image by a loss function, so as to obtain a fifth face image. The merging unit 445 is configured to merge the fifth face image with an image other than the second face image in the target face image, so as to obtain the output image.

The preprocessing may include performing a face alignment, an image enhancement, a normalization and the like. By performing the face alignment on the second face image, a face image with proper facial organ positions may be obtained. The converted second face image is processed with a reverse face-alignment, a face image with same facial organ positions as those of the second face image in an image corresponding to the target face image is obtained, thereby enhancing an image effect. The image enhancement is to improve quality of the face image, so as to not only make the image clearer visually, but also facilitate processing and recognition of the image through a computer. The normalization is to acquire a standard face image having dimensional homogeneity and consistent gray value range, so as to further improve the image effect.

The loss function is a network image trained under a neural-like network, for compensating image loss after the face exchange, thereby improving the image effect.

Alternatively, the preprocessing may at least include a face alignment. As shown in FIG. 5, the face-exchanging unit 405 may also include a reverse face-alignment unit 455. The reverse face-alignment unit 455 is configured to perform a reverse face-alignment on the fourth face image, so as to obtain a sixth face image. The rectifying unit 435 is further configured to rectify the sixth face image with the loss function, so as to obtain the fifth face image.

When the preprocessing is the face alignment, in order to ensure that an orientation of a face in the output image is same with that in the target face image, it is required to perform a reverse face-alignment on the fourth face image, so as to improve the image effect.

Figure 6:
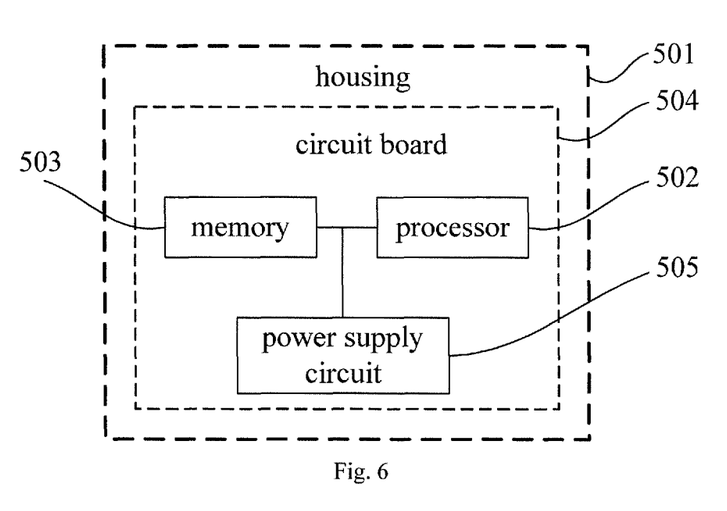
FIG. 6 is a structure diagram of an electronic device according to an embodiment of the present disclosure.

Referring to FIG. 6, FIG. 6 illustrates an electronic device provided by an embodiment of the present disclosure. The electronic device may be a phone, a tablet computer and the like. As illustrated in FIG. 6, the electronic device may include a housing 501, a processor 502, a memory 503, a circuit board 504 and a power supply circuit 505. The circuit board 504 is located in a space enclosed by the housing 501. The processor 502 and the memory 503 are positioned on the circuit board 504. The power supply circuit 505 is configured to provide power for respective circuits or components of the electronic device. The memory 503 is configured to store executable program codes. The processor 502 is configured to run a program corresponding to the executable program codes by reading the executable program codes stored in the memory 503, to perform the acts of: acquiring a first face image in an input image; extracting facial features of the first face image; determining a representation vector of the first face image according to the facial features; determining a target face image in a preset face image library according to the representation vector; and performing a face-exchange processing on the first face image according to the target face image, so as to obtain an output image.

As a possible implementation, the representation vector comprises N dimensions, in which N is an integer greater than 1. When determining a representation vector of the first face image according to the facial features, the processor 502 is further configured to perform acts of: estimating the facial features to obtain at least one representation probability value corresponding to each of the N dimensions, so as to obtain M representation probability values, where M is greater than or equal to N; and performing a weighting processing on the M representation probability values, so as to obtain the representation vector.

As a possible implementation, when estimating the facial features to obtain at least one representation probability value corresponding to each of the N dimensions, the processor 502 is further configured to perform acts of: matching the facial features to a feature parameter of a target dimension, so as to obtain a plurality of matching values, in which the target dimension is one of the N dimensions of the representation vector; and determining a matching value greater than or equal to a preset threshold in the plurality of matching values as a representation probability value corresponding to the target dimension.

As a possible implementation, when performing a face-exchange processing on the first face image according to the target face image so as to obtain the output image, the processor 502 is further configured to perform acts of: performing a preprocessing on a second face image in the target face image, so as to obtain a third face image; replacing facial features of the third face image with the facial features of the first face image, so as to obtain a fourth face image; rectifying the fourth face image by a loss function, so as to obtain a fifth face image; and merging the fifth face image with an image other than the second face image in the target face image, so as to obtain the output image.

As a possible implementation, the preprocessing at least includes a face alignment; after the fourth face image is obtained, the processor 502 is further configured to perform acts of: performing a reverse face-alignment on the fourth face image, so as to obtain a sixth face image; and rectifying the sixth face image by the loss function, so as to obtain the fifth face image.

With the electronic device described in FIG. 5, since the target face image is determined according to the representation vector acquired according to the facial features, the target face image may be the most matched face image with the first face image in the preset face image library, such that the image effect after the face exchange may be improved, the enjoyment may be increased, and it is unnecessary for the user to select a target face image manually, thus improving the operational convenience.

In an embodiment, a non-transitory computer-readable storage medium is provided, which has stored therein a computer program that, when executed by a processor of a device, causes the processor to perform the image processing method according to an embodiment of the present disclosure.

In an embodiment, an application program is provided, which is executable for the image processing method according to an embodiment of the present disclosure.

In embodiments provided in the present disclosure, it may be understood that, the disclosed system, device and method may be realized through other manners. For example, device embodiments described above are merely schematically. For example, a division of modules or units is a logic functional division. In practice, other division manners may be utilized. For example, a plurality of units or components may be combined or integrated into another system, or some feature may be omitted or not executed. For another point, coupling or direct coupling or communicational connections shown or discussed herein are realized through some interfaces. Indirect coupling or communicational connections between devices or units may be electrically, mechanically or in other forms.

The above units described as separated parts may be or may be not physically separated. Parts displayed as units may be or may be not physical units, and they may be located at same position or may be distributed to a plurality of network units. A part of or all of units may be selected according to actual requirements to realize solutions of embodiments of the present disclosure.

In addition, each function cell of the embodiments of the present disclosure may be integrated in a processing module, or these cells may be separate physical existence, or two or more cells are integrated in a processing module. The integrated module may be realized in a form of hardware or in a form of software function modules.

When the integrated module is realized in a form of software function module and is sold or used as a standalone product, the integrated module may be stored in a computer readable storage medium. Based on this understanding, a part of or all of technical solutions of the present disclosure essentially contributing to the prior art, or a part of or all of the technical solutions may be embodied in a form of a software product. The computer software product may be stored in a storage medium including several instructions such that a computer device (may be a personal computer, a server, a network device or the like), or a processor executes all of or a part of blocks of the method provided in embodiments of the present disclosure. The storage medium may include: a USB drive, a mobile hard disk drive, Read-Only Memory (ROM), Random Access Memory (RAM) a magnetic tapes, Compact Disc, and various medium that may store program instructions.

The above embodiments are merely to describe technical solutions of the present disclosure, but not to limit the present disclosure. Changes and alternatives made by those skilled in the art within a technical scope disclosed by the present disclosure should be covered in a protective scope of the present disclosure. Therefore, the protective scope of the present disclosure is determined according to the protective scope of pending claims.

What is claimed is:

1. An image processing method, comprising:
    acquiring a first face image in an input image;
    extracting facial features of the first face image;
    determining a representation vector of the first face image according to the facial features;
    determining a target face image in a preset face image library according to the representation vector; and
    performing a face-exchange processing on the first face image according to the target face image, so as to obtain an output image,
    wherein the representation vector comprises N dimensions, where N is an integer greater than 1, and
    wherein determining a representation vector of the first face image according to the facial features comprises:
        estimating the facial features to obtain at least one representation probability value corresponding to each of the N dimensions, so as to obtain M representation probability values, where M is greater than or equal to N; and
        performing a weighting processing on the M representation probability values, so as to obtain the representation vector.

2. The image processing method according to claim 1, wherein acquiring the first face image in an input image comprises:
    extracting a feature value of the input image;
    performing an integration processing on the input image according to the feature value to obtain an integral image;

adopting an adaptive enhancement algorithm for distinguishing enhanced classifiers for faces and enhanced classifiers for non-faces in the integral image;

connecting the enhanced classifiers for faces to obtain a face image;

determining whether the face image is the first face image, if yes, acquiring the first face image.

3. The image processing method according to claim 2, wherein performing a face-exchange processing on the first face image according to the target face image so as to obtain the output image comprises:

performing a preprocessing on a second face image in the target face image, so as to obtain a third face image;

replacing facial features of the third face image with the facial features of the first face image, so as to obtain a fourth face image;

rectifying the fourth face image by a loss function, so as to obtain a fifth face image; and merging the fifth face image with an image other than the second face image in the target face image, so as to obtain the output image.

4. The image processing method according to claim 3, wherein the preprocessing at least comprises a face alignment; and after the fourth face image is obtained, the image processing method further comprises:

performing a reverse face-alignment on the fourth face image, so as to obtain a sixth face image; and rectifying the sixth face image by the loss function, so as to obtain the fifth face image.

5. The image processing method according to claim 1, wherein estimating the facial features to obtain at least one representation probability value corresponding to each of the N dimensions comprises:

matching the facial features to a feature parameter of a target dimension, so as to obtain a plurality of matching values, in which the target dimension is one of the N dimensions of the representation vector; and determining a matching value greater than or equal to a preset threshold in the plurality of matching values as a representation probability value corresponding to the target dimension.

6. The image processing method according to claim 5, wherein performing a face-exchange processing on the first face image according to the target face image so as to obtain the output image comprises:

performing a preprocessing on a second face image in the target face image, so as to obtain a third face image;

replacing facial features of the third face image with the facial features of the first face image, so as to obtain a fourth face image;

rectifying the fourth face image by a loss function, so as to obtain a fifth face image; and merging the fifth face image with an image other than the second face image in the target face image, so as to obtain the output image.

7. The image processing method according to claim 6, wherein the preprocessing at least comprises a face alignment; and after the fourth face image is obtained, the image processing method further comprises:

performing a reverse face-alignment on the fourth face image, so as to obtain a sixth face image; and rectifying the sixth face image by the loss function, so as to obtain the fifth face image.

8. The image processing method according to claim 1, wherein performing a face-exchange processing on the first face image according to the target face image so as to obtain the output image comprises:

performing a preprocessing on a second face image in the target face image, so as to obtain a third face image;

replacing facial features of the third face image with the facial features of the first face image, so as to obtain a fourth face image;

rectifying the fourth face image by a loss function, so as to obtain a fifth face image; and merging the fifth face image with an image other than the second face image in the target face image, so as to obtain the output image.

9. The image processing method according to claim 8, wherein the preprocessing at least comprises a face alignment; and after the fourth face image is obtained, the image processing method further comprises:

performing a reverse face-alignment on the fourth face image, so as to obtain a sixth face image; and rectifying the sixth face image by the loss function, so as to obtain the fifth face image.

10. The image processing method according to claim 1, wherein performing a face-exchange processing on the first face image according to the target face image so as to obtain the output image comprises:

performing a preprocessing on a second face image in the target face image, so as to obtain a third face image;

replacing facial features of the third face image with the facial features of the first face image, so as to obtain a fourth face image;

rectifying the fourth face image by a loss function, so as to obtain a fifth face image; and merging the fifth face image with an image other than the second face image in the target face image, so as to obtain the output image.

11. The image processing method according to claim 10, wherein the preprocessing at least comprises a face alignment; and after the fourth face image is obtained, the image processing method further comprises:

performing a reverse face-alignment on the fourth face image, so as to obtain a sixth face image; and rectifying the sixth face image by the loss function, so as to obtain the fifth face image.

12. An electronic device, comprising a housing, a processor, a memory, a circuit board, a power supply circuit, wherein, the circuit board is located in a space enclosed by the housing; the processor and the memory are positioned on the circuit board; the power supply circuit is configured to provide power for respective circuits or components of the electronic device; the memory is configured to store executable program codes; and the processor is configured to run a program corresponding to the executable program codes by reading the executable program codes stored in the memory, to perform the image processing method comprising:

acquiring a first face image in an input image;

extracting facial features of the first face image;

determining a representation vector of the first face image according to the facial features;

determining a target face image in a preset face image library according to the representation vector; and performing a face-exchange processing on the first face image according to the target face image, so as to obtain an output image, wherein the representation vector comprises N dimensions, where N is an integer greater than 1, and wherein determining a representation vector of the first face image according to the facial features comprises:

estimating the facial features to obtain at least one representation probability value corresponding to each of the N dimensions, so as to obtain M representation probability values, where M is greater than or equal to N; and performing a weighting processing on the M representation probability values, so as to obtain the representation vector.

13. The electronic device according to claim 12, wherein estimating the facial features to obtain at least one representation probability value corresponding to each of the N dimensions comprises:

matching the facial features to a feature parameter of a target dimension, so as to obtain a plurality of matching values, in which the target dimension is one of the N dimensions of the representation vector; and determining a matching value greater than or equal to a preset threshold in the plurality of matching values as a representation probability value corresponding to the target dimension.

14. The electronic device according to claim 13, wherein performing a face-exchange processing on the first face image according to the target face image so as to obtain the output image comprises:

performing a preprocessing on a second face image in the target face image, so as to obtain a third face image;

replacing facial features of the third face image with the facial features of the first face image, so as to obtain a fourth face image;

rectifying the fourth face image by a loss function, so as to obtain a fifth face image; and merging the fifth face image with an image other than the second face image in the target face image, so as to obtain the output image.

15. The electronic device according to claim 12, wherein performing a face-exchange processing on the first face image according to the target face image so as to obtain the output image comprises:

performing a preprocessing on a second face image in the target face image, so as to obtain a third face image;

replacing facial features of the third face image with the facial features of the first face image, so as to obtain a fourth face image;

rectifying the fourth face image by a loss function, so as to obtain a fifth face image; and merging the fifth face image with an image other than the second face image in the target face image, so as to obtain the output image.

16. The electronic device according to claim 15, wherein the preprocessing at least comprises a face alignment; and after the fourth face image is obtained, the image processing method further comprises:

performing a reverse face-alignment on the fourth face image, so as to obtain a sixth face image; and rectifying the sixth face image by the loss function, so as to obtain the fifth face image.

17. The electronic device according to claim 12, wherein performing a face-exchange processing on the first face image according to the target face image so as to obtain the output image comprises:

performing a preprocessing on a second face image in the target face image, so as to obtain a third face image;

replacing facial features of the third face image with the facial features of the first face image, so as to obtain a fourth face image;

rectifying the fourth face image by a loss function, so as to obtain a fifth face image; and merging the fifth face image with an image other than the second face image in the target face image, so as to obtain the output image.

18. A non-transitory computer-readable storage medium having stored therein a computer program that, when executed by a processor of a device, causes the processor to perform the image processing method comprising:

acquiring a first face image in an input image;

extracting facial features of the first face image;

determining a representation vector of the first face image according to the facial features;

determining a target face image in a preset face image library according to the representation vector; and performing a face-exchange processing on the first face image according to the target face image, so as to obtain an output image, wherein the representation vector comprises N dimensions, where N is an integer greater than 1, and wherein determining a representation vector of the first face image according to the facial features comprises:

estimating the facial features to obtain at least one representation probability value corresponding to each of the N dimensions, so as to obtain M representation probability values, where M is greater than or equal to N; and performing a weighting processing on the M representation probability values, so as to obtain the representation vector.

* * * * *